US011554981B2

(12) United States Patent
Binko et al.

(10) Patent No.: US 11,554,981 B2
(45) Date of Patent: Jan. 17, 2023

(54) APPARATUSES AND METHODS FOR PROCESSING OPTICAL FIBER PREFORMS

(71) Applicant: CORNING INCORPORATED, Corning, NY (US)

(72) Inventors: Randy Allan Binko, Hampstead, NC (US); Steven Bruce Dawes, Corning, NY (US); Nikolay Anatolyevich Panin, Wilmington, NC (US); Bradley Kent Shepard, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 126 days.

(21) Appl. No.: 16/890,037

(22) Filed: Jun. 2, 2020

(65) Prior Publication Data

US 2020/0392034 A1 Dec. 17, 2020

Related U.S. Application Data

(60) Provisional application No. 62/859,945, filed on Jun. 11, 2019.

(51) Int. Cl.
*C03B 37/07* (2006.01)
*C03B 37/014* (2006.01)

(52) U.S. Cl.
CPC .................................. *C03B 37/07* (2013.01)

(58) Field of Classification Search
None
See application file for complete search history.

(56) References Cited

U.S. PATENT DOCUMENTS 4,825,879 A 5/1989 Tan et al.
5,470,369 A * 11/1995 Tsuchiya ........... C03B 37/01446
65/379

(Continued)

FOREIGN PATENT DOCUMENTS

JP 62-059535 A 3/1987
JP 62-216934 A 9/1987

(Continued)

OTHER PUBLICATIONS

JP2003-137584 Machine Translation of the Description performed by EPO Dec. 2, 2021. (Year: 2021).*

(Continued)

*Primary Examiner* — Lisa L Herring
(74) *Attorney, Agent, or Firm* — Kevin L. Bray

(57) ABSTRACT

Apparatuses and methods for processing optical fiber preforms are disclosed. According to one aspect, an apparatus generally includes a furnace body and a muffle disposed within the furnace body. A space between the muffle and the furnace body defines a first interior volume. The muffle defines a second interior volume sealed from the first interior volume. An annulus gas is supplied to the first interior volume and a process gas is supplied to the second interior volume. A differential pressure gauge is coupled to the interior volumes. A flow controller is coupled to at least one of the gas sources and to the differential pressure gauge. The flow controller receives a differential pressure signal from the differential pressure gauge and adjusts a flow of a gas such that the pressure differential between the first interior volume and the second interior volume is minimized.

13 Claims, 11 Drawing Sheets

(56) References Cited

U.S. PATENT DOCUMENTS

| | | |
|---|---|---|
| 8,037,717 B2 | 10/2011 | Dawes et al. |
| 9,618,692 B2 | 4/2017 | Berkey et al. |
| 9,802,858 B2 | 10/2017 | Bookbinder et al. |
| 2002/0000102 A1* | 1/2002 | Kohmura ............ C03B 37/0146 65/157 |
| 2003/0000255 A1* | 1/2003 | Kohmura ............ C03B 37/0146 65/384 |
| 2004/0240814 A1 | 12/2004 | Boek et al. |
| 2005/0257571 A1* | 11/2005 | Koaizawa ............ C03B 37/0146 65/397 |

FOREIGN PATENT DOCUMENTS

| | | |
|---|---|---|
| JP | 06-059438 U | 8/1994 |
| JP | 11-035329 A | 2/1999 |
| JP | 2003-137584 A | 5/2003 |
| WO | 03/37811 A1 | 5/2003 |

OTHER PUBLICATIONS

International Search Report and Written Opinion of the International Searching Authority; PCT/US2020/035691; dated Nov. 4, 2020; 19 Pages; European Patent Office.

\* cited by examiner

APPARATUSES AND METHODS FOR PROCESSING OPTICAL FIBER PREFORMS

This Application claims priority under 35 USC § 119(e) from U.S. Provisional Patent Application Ser. No. 62/859,945, filed on Jun. 11, 2019, and which is incorporated by reference herein in its entirety.

BACKGROUND

Field

The present specification generally relates to optical fiber preforms and, more particularly, to apparatuses for processing optical fiber preforms.

Technical Background

Optical fiber preforms, such as those used to form optical fibers with halogen-doped cores, may be produced through a consolidation process that includes a drying step, an evacuation step, a doping step, and a sintering step. These processes often include exposing the optical fiber preform to both increased pressure and increased temperature. To achieve the desired quality of optical fiber, the optical fiber preform must be processed in an environment containing very few contaminants. That is, the presence of transition metals, silanol groups (SiOH), and residual gases in the processing environment must be extremely low so as not to impact the properties of the optical fiber drawn from the optical fiber preform. To achieve this, optical fiber preforms may be processed in thin-walled containers (muffles) that provide a processing environment which contain a relatively low concentration of contaminants. However, the material of the muffles cannot reliably serve as a pressure barrier under typical (i.e., high pressure) processing conditions preferred for halogen-doped optical fiber preforms. As such, alternative thick-walled and/or ceramic muffles have been proposed. However, these muffles pose large cost and manufacturing challenges.

Accordingly, a need exists for alternative apparatuses and methods for processing optical fiber preforms that provide the efficiency and benefits of thin-walled muffles while also being capable of withstanding high dopant gas pressures experienced during processing of halogen-doped optical fiber preforms.

SUMMARY

According to a first aspect, an apparatus for processing an optical fiber preform includes a muffle disposed within a furnace body. The muffle is configured to receive the optical fiber preform. A space between the muffle and the furnace body defines a first interior volume. A space within the muffle defines a second interior volume sealed from the first interior volume. A first inlet is coupled to the first interior volume and to an annulus gas source and may supply an annulus gas to the first interior volume. A first outlet is coupled to the first interior volume and may exhaust the annulus gas from the first interior volume. A second inlet is coupled to the second interior volume and to a process gas source and may supply a process gas to the second interior volume. A second outlet is coupled to the second interior volume and may exhaust the process gas from the second interior volume. A differential pressure gauge is fluidly coupled to the first interior volume and the second interior volume. A flow controller is fluidly coupled to at least one of the annulus gas source and the process gas source and is communicatively coupled to the differential pressure gauge. The flow controller may receive a differential pressure signal from the differential pressure gauge and adjust at least one of a flow of the annulus gas from the annulus gas source and a flow of the process gas from the process gas source such that the pressure differential between the first interior volume and the second interior volume is from −7.0 kPa to 7.0 kPa.

A second aspect includes the apparatus of the first aspect, wherein the flow controller is fluidly coupled to the annulus gas source and the process gas source. The flow controller may adjust the flow of the annulus gas from the annulus gas source and the flow of the process gas from the process gas source such that the pressure differential between the first interior volume and the second interior volume is from −7.0 kPa to 7.0 kPa.

A third aspect includes the apparatus of any of the first or second aspects, wherein the second interior volume is sealed from the first interior volume by at least one gasket disposed between the muffle and the furnace body.

A fourth aspect includes the apparatus of any of the first through third aspects, wherein the second inlet comprises a fused silica tube.

A fifth aspect includes the apparatus of any of the first through fourth aspects, wherein the furnace body includes a pressure vessel and a lid removably coupled to the pressure vessel. The lid includes a first lid segment and a second lid segment. The first lid segment has an opening therein, wherein the second lid segment is removably disposed in the first lid segment.

A sixth aspect includes the apparatus of any of the first through fifth aspects, wherein the second inlet and the second outlet are coupled to the second interior volume at opposite ends of the second interior volume.

A seventh aspect includes the apparatus of any of the first through sixth aspects, wherein the apparatus further includes at least one heating element positioned within the first interior volume and disposed around the muffle.

An eighth aspect includes the apparatus of the seventh aspect, wherein the at least one heating element includes a plurality of heating zones. Each heating zone of the plurality of heating zones is independently controlled.

According to a ninth aspect, a furnace for processing an optical fiber preform includes a muffle disposed within a pressure vessel. The muffle is configured to receive the optical fiber preform. A space between the muffle and the pressure vessel define a first interior volume. A space within the muffle defines a second interior volume sealed from the first interior volume. A lid is removably coupled to the pressure vessel. The lid includes a first lid segment and a second lid segment. The first lid segment has an opening therein, wherein the second lid segment is removably disposed in the first lid segment. At least one heating element is positioned within the first interior volume and disposed around the muffle.

A tenth aspect includes the furnace of the ninth aspect, wherein the second interior volume is sealed from the first interior volume by at least one gasket disposed between the muffle and the pressure vessel.

An eleventh aspect includes the furnace of any of the ninth through tenth aspects, wherein the second interior volume is sealed from the first interior volume by at least one gasket disposed between the muffle and the pressure vessel and at least one gasket disposed between the muffle and the lid.

A twelfth aspect includes the furnace of the eleventh aspect, wherein the at least one gasket disposed between the muffle and the pressure vessel and the at least one gasket disposed between the muffle and the lid are the same diameter.

A thirteenth aspect includes the furnace of any of the ninth through twelfth aspects, wherein the furnace further includes a handle assembly for supporting the optical fiber preform in the muffle. The handle assembly is removably coupled to the muffle and extends into the second interior volume.

A fourteenth aspect includes the furnace of any of the ninth through twelfth aspects, wherein the handle assembly is removable from the muffle through the second lid segment.

According to a fifteenth aspect, a method for processing an optical fiber preform includes suspending at least one optical fiber preform in a second interior volume. The second interior volume is defined by a muffle. The muffle is disposed within a furnace body. A space between the muffle and the furnace body defines a first interior volume sealed from the second interior volume. A first inlet is coupled to the first interior volume and to an annulus gas source and may supply an annulus gas to the first interior volume. A first outlet is coupled to the first interior volume and may exhaust the annulus gas from the first interior volume. A second inlet is coupled to the second interior volume and to a process gas source and may supply a process gas to the second interior volume. A second outlet is coupled to the second interior volume and may exhaust the process gas from the second interior volume. The method further includes flowing an annulus gas through the first inlet and exhausting the annulus gas from the first outlet, flowing a process gas through the second inlet and exhausting the process gas from the second outlet, and regulating the flow of at least one of the annulus gas and the process gas such that a pressure differential between the first interior volume and the second interior volume is from −7.0 kPa to 7.0 kPa.

A sixteenth aspect includes the method of the fifteenth aspect, wherein the method further includes at least one heating element positioned within the first interior volume and disposed around the muffle. The at least one heating element heats the muffle to a temperature of from about 1000° C. to about 1500° C.

A seventeenth aspect includes the method of the sixteenth aspect, wherein the at least one optical fiber preform is heated to a temperature of from about 1000° C. to about 1500° C. An eighteenth aspect includes the method of any of the sixteenth or seventeenth aspects, wherein an outer radius of the muffle changes a maximum of from about 1 mm to about 20 mm.

A nineteenth aspect includes the method of any of the sixteenth through eighteenth aspects, wherein the process gas includes chlorine, fluorine, bromine, or any combination thereof.

A twentieth aspect includes the method of any of the fifteenth through nineteenth aspects, wherein both the flow of annulus gas and the flow of process gas are regulated such that the pressure differential between the first interior volume and the second interior volume is from −7.0 kPa to 7.0 kPa.

A twenty-first aspect includes the method of any of the fifteenth through twentieth aspects, wherein a pressure of the process gas in the first interior volume is at least 1000 kPa.

Additional features and advantages of the apparatuses and methods described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
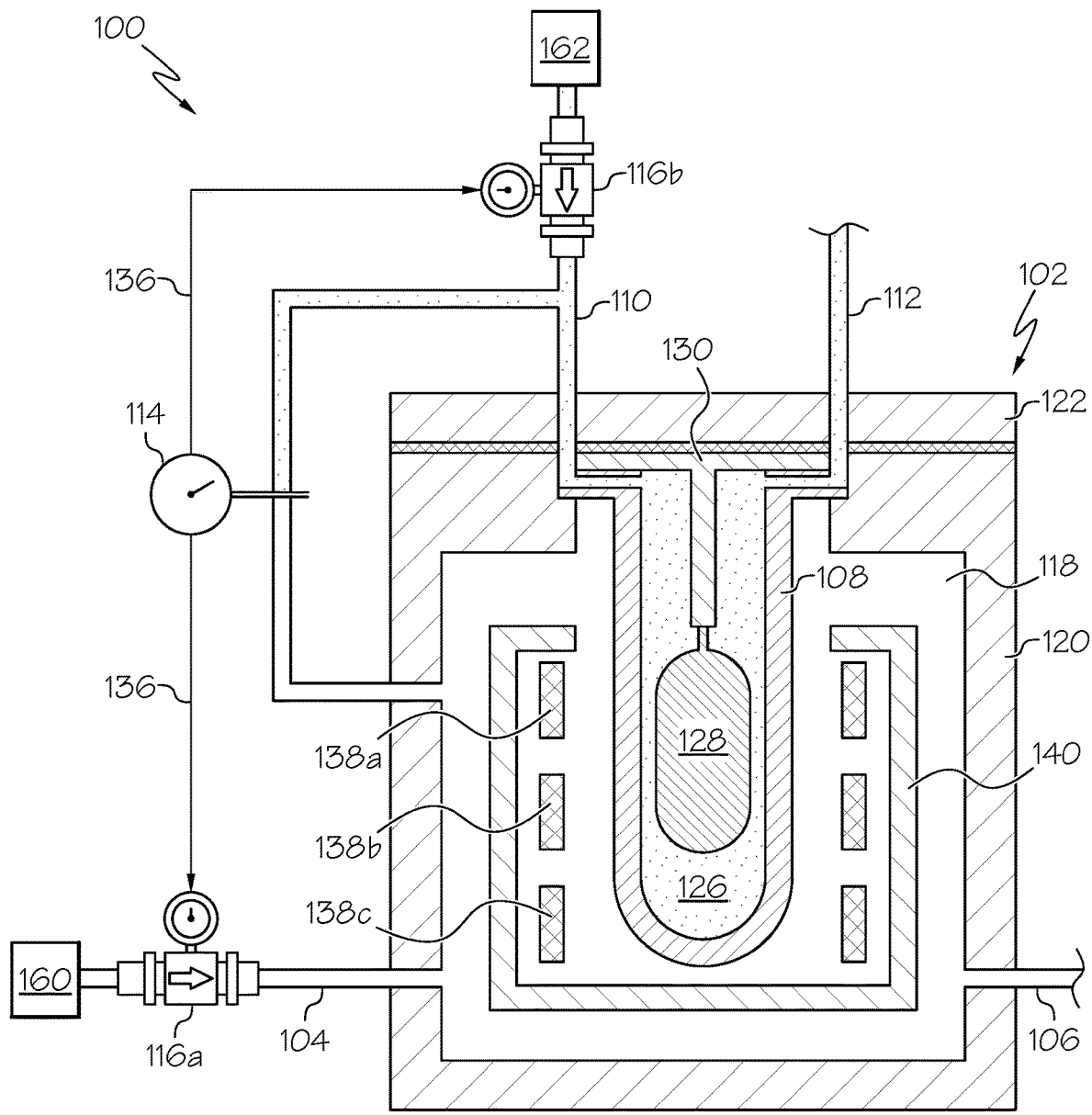
FIG. 1A schematically depicts a cross section of an apparatus for processing an optical fiber preform, according to one or more embodiments shown and described herein.

Reference will now be made in detail to embodiments of apparatuses for processing optical fiber preforms described herein, examples of which are illustrated in the accompanying drawings. Whenever possible, the same reference numerals will be used throughout the drawings to refer to the same or like parts. One embodiment of the apparatus is shown in FIG. 1A, and is designated generally throughout by the reference numeral 100.

The apparatus generally includes a furnace body and a muffle disposed within the furnace body. A space between the muffle and the furnace body defines a first interior volume and a space within the muffle defines a second interior volume. A first inlet may be coupled to the first interior volume and to an annulus gas source to supply an annulus gas to the first interior volume. A first outlet may be coupled to the first interior volume to exhaust the annulus gas from the first interior volume. A second inlet may be coupled to the second interior volume and to a process gas source to supply a process gas to the second interior volume. A second outlet may be coupled to the second interior volume to exhaust the process gas from the second interior volume. A differential pressure gauge may be fluidly coupled to the first interior volume and the second interior volume. A flow controller may be fluidly coupled to at least one of the annulus gas source and the process gas source and communicatively coupled to the differential pressure gauge.

The flow controller may include a processor and a non-transitory memory storing computer readable and executable instructions which, when executed by the processor, cause the flow controller to receive a differential pressure signal from the differential pressure gauge and adjust at least one of a flow of the annulus gas from the annulus gas source and a flow of the process gas from the process gas source such that the pressure differential between the first interior volume and the second interior volume is from −7.0 kPa to 7.0 kPa. Various embodiments of the apparatuses and methods for processing optical fiber preforms will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As described hereinabove, thin-walled muffles, such as fused silica muffles, may be used to provide a processing environment for the processing of optical fiber preforms with low risk of contamination. That is, the silica of the fused silica of the muffle does not generally react with the materials used to process the optical fiber preform. However, these muffles cannot reliably withstand the high pressures that may be used in some operations such as, for example and without limitation, doping the optical fiber preform. Even minor positive or negative pressure differentials between the inside and outside of the fused silica muffle may cause mechanical failure.

The embodiments described herein provide apparatuses for processing optical fiber preforms that allow for the use of thin-walled muffles while also withstanding the relatively high pressures experienced during processing of optical fiber preforms. Specifically, the apparatuses may be used to minimize the pressure differential between the inside and outside of the muffle during processing.

Referring now to FIG. 1A, an apparatus 100 for processing an optical fiber preform 128 is schematically depicted. The apparatus 100 generally comprises a furnace body 102, a first inlet 104, a first outlet 106, a muffle 108, a second inlet 110, a second outlet 112, a differential pressure gauge 114, and flow controllers 116a and 116b.

In the embodiment of the apparatus 100 described herein, the furnace body 102 may generally comprise a pressure vessel 120 including a lid 122. The pressure vessel 120 and the lid 122 define a first interior volume 118. In embodiments, the lid 122 may be removably coupled to the pressure vessel 120 proximate to the top of the pressure vessel 120 (i.e., in the +Z direction of the coordinate axis depicted in the figures). The lid 122 may be removably coupled to the pressure vessel 120 to facilitate positioning an optical fiber preform 128 in the pressure vessel 120, as will be described in further detail herein. In embodiments, the lid 122 may be removably coupled to the pressure vessel 120, for example and without limitation, by a plurality of latches (not depicted). In embodiments, the lid 122 creates an airtight seal with the pressure vessel 120. In embodiments, an O-ring may be disposed between the lid 122 and the pressure vessel 120 to facilitate the airtight seal.

Figure 2A:
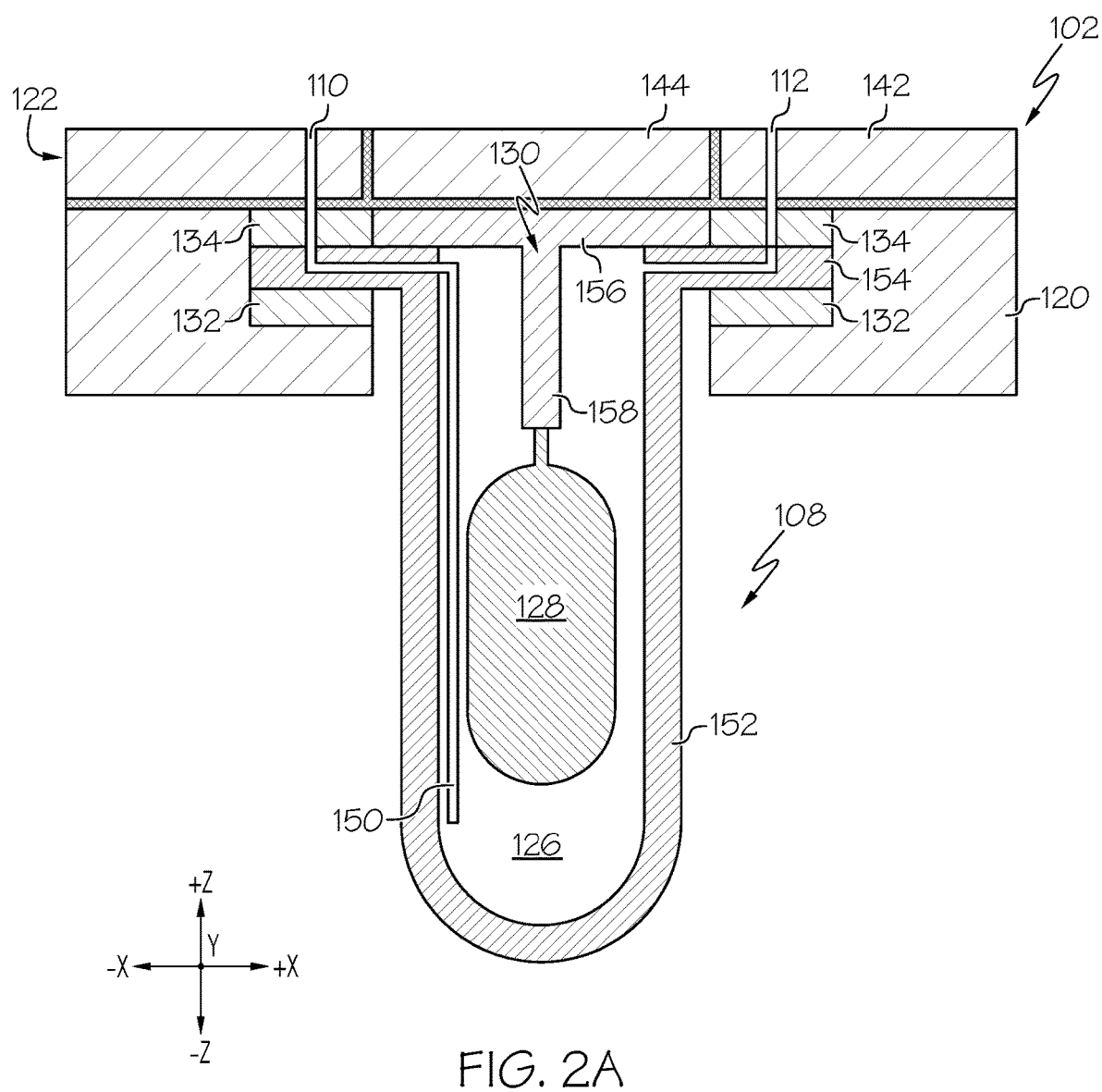
FIG. 2A schematically depicts a close-up view of a portion of the apparatuses for processing an optical fiber preform depicted in FIGS. 1A-1E, according to one or more embodiments shown and described herein.
Figure 2B:
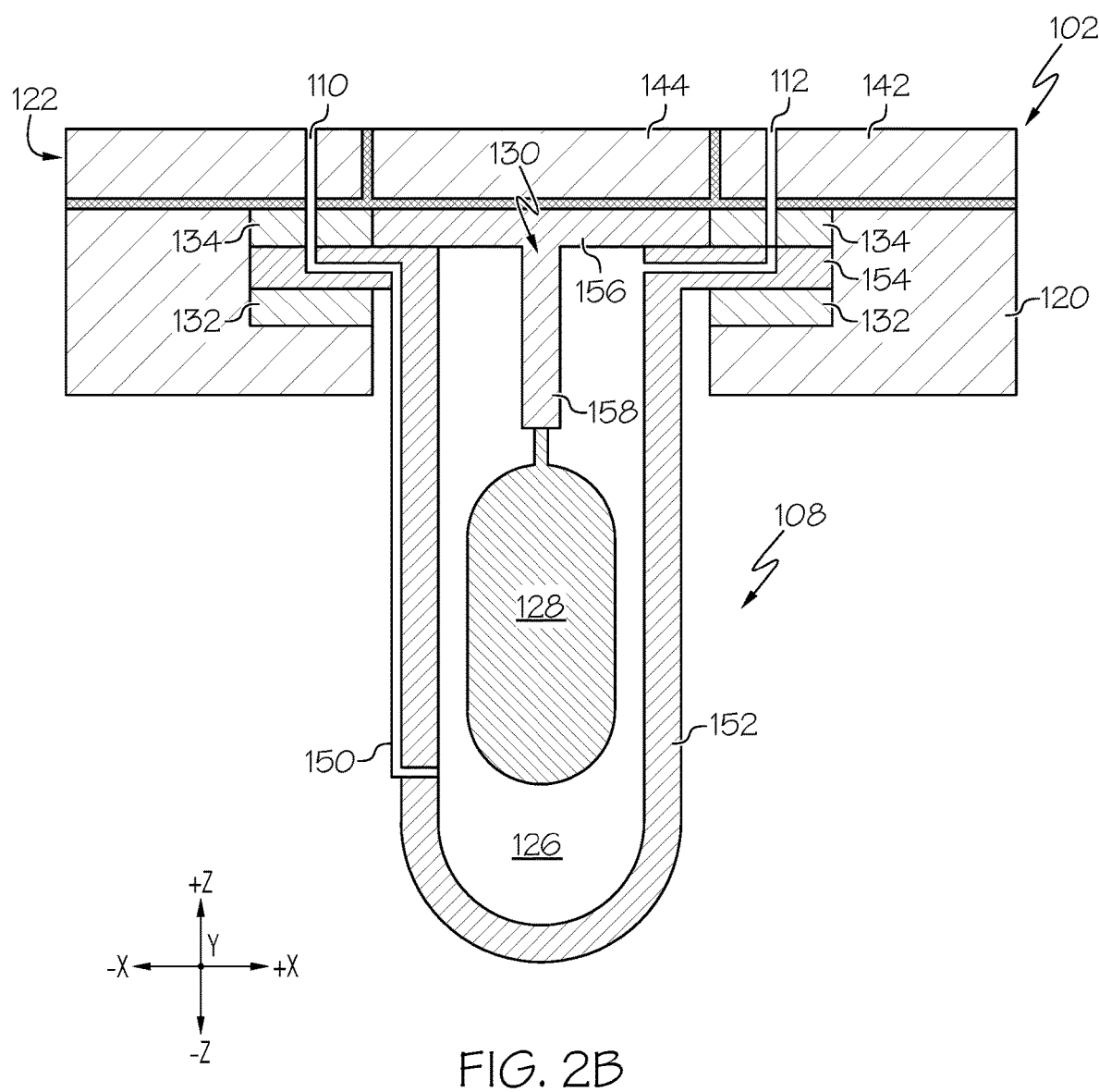
FIG. 2B schematically depicts a close-up view of a portion of the apparatuses for processing an optical fiber preform depicted in FIGS. 1A-1E, according to one or more embodiments shown and described herein.

Referring now to FIGS. 2A and 2B, in embodiments the lid 122 may comprise a first lid segment 142 and a second lid segment 144. Specifically, the first lid segment 142 may comprise an opening therein such that the second lid segment 144 may be removably disposed within the first lid segment 142. In embodiments, the second lid segment 144 may be removed from the first lid segment 142, allowing for access to an optical fiber preform 128 positioned within the furnace body 102. This may allow for quick removal of the optical fiber preform 128 from the furnace body 102 without extensive disassembly of the furnace body 102 and, as a result, increases the efficiency of processing optical fiber preforms.

Referring again to FIG. 1A, the furnace body 102 may generally comprise an airtight vessel capable of withstanding the conditions required to process the optical fiber preform 128. The furnace body 102 may generally be constructed of a material capable of withstanding the conditions required to process the optical fiber preform 128. For example, the furnace body 102 may be a high-temperature, high-pressure steel furnace in embodiments.

In the embodiments described herein, a first inlet 104 may be sealingly coupled to the furnace body 102 and to an annulus gas source 160 for supplying an annulus gas to the first interior volume 118. In embodiments, the first inlet 104 may extend through the pressure vessel 120 of the furnace body 102, as depicted in FIG. 1A. In embodiments (not depicted), the first inlet 104 may extend through the lid 122 of the furnace body 102. In embodiments, the annulus gas may be supplied to the first interior volume 118 from the annulus gas source 160 such that the pressure of the first interior volume 118 is from about 100 kPa to about 5000 kPa, from about 500 kPa to about 5000 kPa, from about 1000 kPa to about 5000 kPa, from about 1500 kPa to about 4000 kPa, from about 2000 kPa to about 4000 kPa, from about 2500 kPa to about 4000 kPa, from about 3000 kPa to about 4000 kPa, from about 3500 kPa to about 4000 kPa, from about 100 kPa to about 3500 kPa, from about 100 kPa to about 3000 kPa, from about 100 kPa to about 2500 kPa, from about 100 kPa to about 2000 kPa, from about 100 kPa to about 1500 kPa, from about 100 kPa to about 1000 kPa, or from about 100 kPa to about 500 kPa.

Figure 1B:
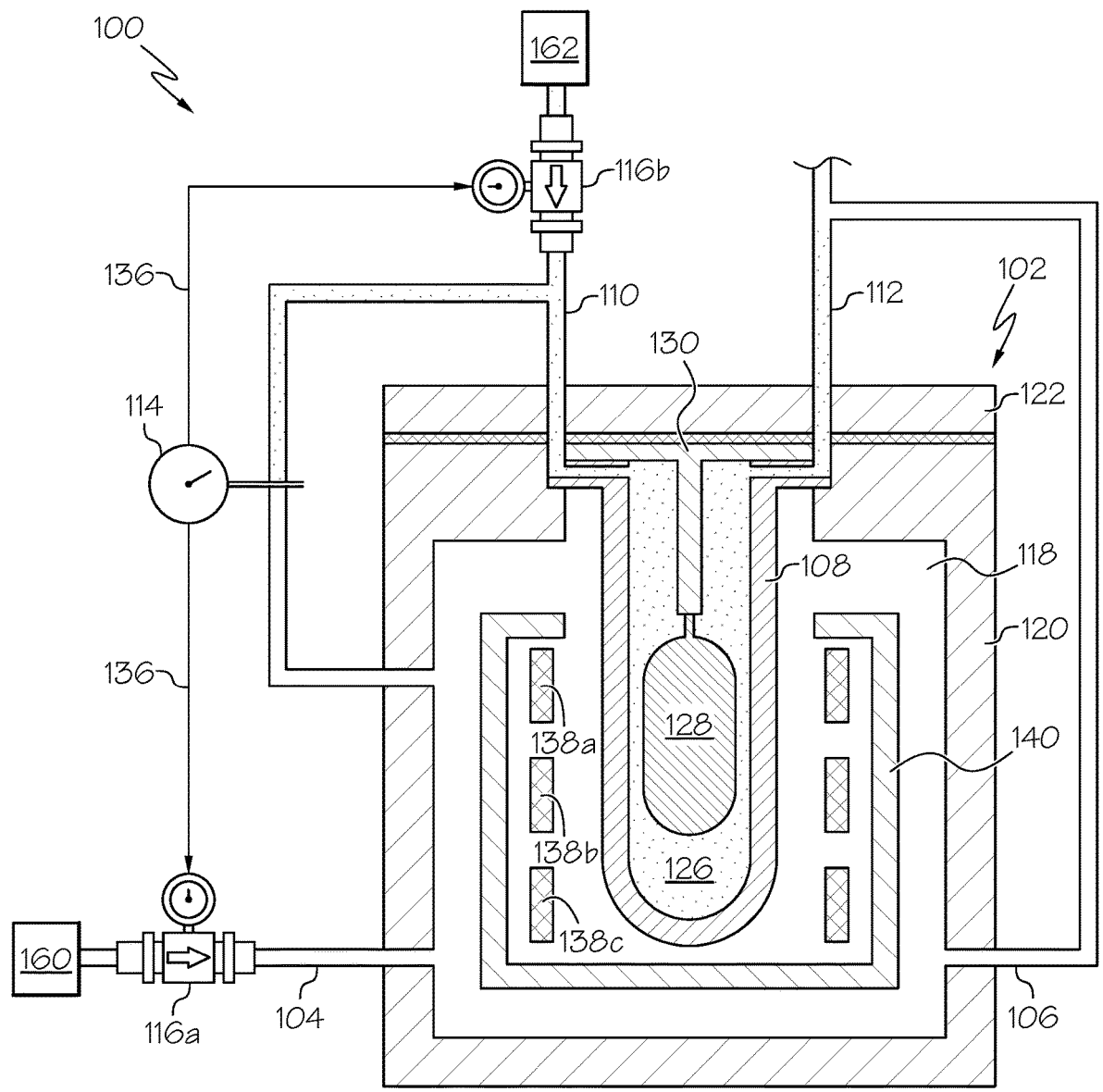
FIG. 1B schematically depicts a cross section of an apparatus for processing an optical fiber preform, according to one or more embodiments shown and described herein.

In the embodiments described herein, a first outlet 106 may be sealingly coupled to the furnace body 102 for exhausting the annulus gas from the first interior volume 118. The apparatus 100 may comprise the first outlet 106 in various configurations. For example, referring now to FIG. 1B, the apparatus 100 may comprise the first outlet 106 in a first configuration, wherein the first outlet 106 is sealingly coupled to the second outlet 112. In such embodiments, both the annulus gas from the first interior volume 118 and the process gas from the second interior volume 126 are exhausted from a common outlet.

Figure 1C:
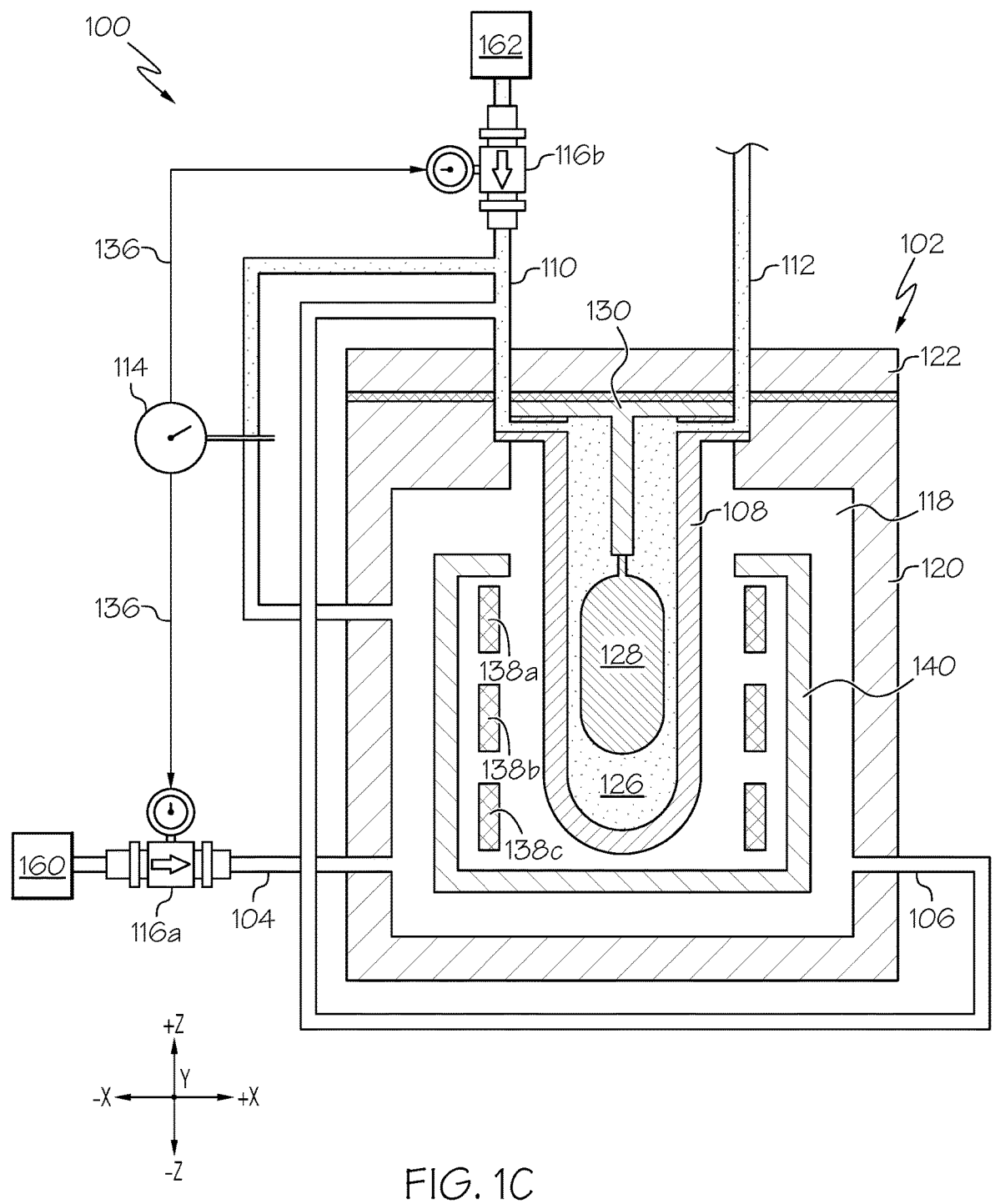
FIG. 1C schematically depicts a cross section of an apparatus for processing an optical fiber preform, according to one or more embodiments shown and described herein.

Referring now to FIG. 1C, in embodiments, the apparatus 100 may comprise the first outlet 106 in a first configuration, wherein the first outlet 106 is sealingly coupled to the second inlet 110. In such embodiments, the annulus gas from the first interior volume 118 passes through the second interior volume 126 before being exhausted from the second outlet 112. Accordingly, in such embodiments, the annulus gas from the first interior volume 118 and the process gas from the second interior volume 126 may comprise the same or similar compounds, such that the flow of the annulus gas from the first interior volume 118 through the second interior volume 126 does not negatively affect the processing of the optical fiber preform. This second configuration may assist in maintaining the pressure differential between the first interior volume 118 and the second interior volume 126 in a suitable range (e.g., from −7.0 kPa to 7.0 kPa); however, the passing of annulus gas from the first interior volume 118 through the second interior volume 126 may introduce contaminants into the second interior volume 126 and reduce the quality of the optical fiber preform. In embodiments, the first outlet 106 may extend through the pressure vessel 120 of the furnace body 102, as depicted in FIG. 1A. In embodiments (not depicted), the first outlet 106 may extend through the lid 122 of the furnace body 102.

Referring now to FIGS. 2A-2D, in the embodiments described herein the muffle 108 may generally comprise at least one sidewall 152 and a muffle flange 154. In embodiments, the muffle flange 154 extends radially outward from the sidewall 152 proximate to the top (i.e., the end of the sidewall 152 in the +Z direction of the coordinate axis depicted in the figures). In embodiments, the muffle flange 154 is substantially perpendicular to the sidewall 152 in a horizontal plane (i.e., the muffle flange 154 extends radially outward from the sidewall 152 in the X-Y plane of the coordinate axis depicted in the figures). The muffle 108 defines a second interior volume 126 enclosed by the sidewall 152 of the muffle 108. An optical fiber preform 128 may be positioned in the second interior volume 126 of the muffle 108 during processing of the optical fiber preform 128. In embodiments, the muffle 108 is a sealed-end muffle. That is, the muffle 108 only comprises an opening at one end. In embodiments (not depicted), the muffle 108 may comprise openings at the top and bottom of the muffle 108.

As depicted in FIGS. 1A-1E, the muffle 108 may be seated within the furnace body 102 and supported within the furnace body 102 by the muffle flange 154. In embodiments, the first interior volume 118 may be further defined as the space between the muffle 108 and the furnace body 102. Referring again to FIGS. 2A-2D, in embodiments a gasket 132 may be disposed between the muffle flange 154 of the muffle 108 and the pressure vessel 120 of the furnace body 102. The gasket 132 may comprise, for example and without limitation, a flexible graphite material. When compressed between the muffle flange 154 and the pressure vessel 120, the gasket 132 may form an airtight seal between the muffle 108 and the furnace body 102. That is, the gasket 132 may facilitate the complete sealing of second interior volume 126 of the muffle 108 from the first interior volume 118 of the furnace body 102 such that second interior volume 126 is not fluidly coupled to the first interior volume 118.

In embodiments, a gasket 134 may be disposed between the muffle flange 154 of the muffle 108 and the lid 122 of the furnace body 102. The gasket 134 may comprise, for example and without limitation, a flexible graphite material. When compressed between the muffle flange 154 and the lid 122, the gasket 134 may form an airtight seal between the muffle 108 and the lid 122. That is, the gasket 134 may facilitate the complete sealing of second interior volume 126 of the muffle 108. As described hereinabove, a processing environment with fewer contaminants may result in a higher quality optical fiber preform. In that regard, the creation of an airtight seal between the second interior volume 126 and the outside environment may result in a processing environment with fewer contaminants and a higher quality optical fiber preform.

Figure 3:
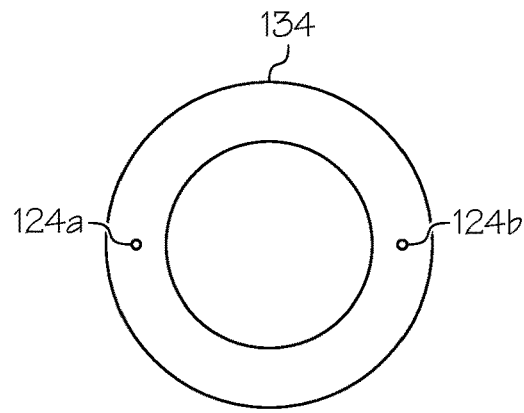
FIG. 3 schematically depicts a gasket for use in an apparatus for processing an optical fiber preform, according to one or more embodiments shown and described herein.

Referring now to FIG. 3, in embodiments the gasket 134, disposed between the muffle 108 and the lid 122 of the furnace body 102, may comprise two guide holes 124a and 124b. As described herein, inlets and outlets coupled to the second interior volume 126 may pass through the lid 122 and the muffle flange 154. In such embodiments, the guide holes 124a and 124b may allow for inlets and outlets to pass through the lid 122, the muffle flange 154, and the gasket 134 without disrupting the airtight seal.

In embodiments, the gasket 132 and the gasket 134 may comprise the same diameter to balance the forces experienced by the muffle 108. Specifically, when a clamping or closing force is applied to the lid 122, the lid compresses the gaskets 132 and 134, creating an airtight seal as described above. In embodiments where the gaskets 132 and 134 comprise the same diameter, the tensile stresses present within the muffle 108, specifically within the muffle flange 154, are evenly distributed compared to embodiments where the gaskets 132, 134 comprise different diameters. As described hereinabove, a fused silica muffle may be extremely susceptible to stress resulting in mechanical failure. As such, embodiments where the gaskets 132 and 134 comprise the same diameter, the chances of mechanical failure of muffle 108 may be reduced.

In embodiments, the muffle 108 may be formed from a material which reduces or eliminates contaminates caused by reactions between the process gases and the material of the muffle at elevated temperatures. As such, in embodiments the optical fiber preform 128 may be processed to a purity encompassing from about 0.1 parts per billion (ppb) to about 1 ppb by weight of impurities such as, for example, transition metals and SiOH. In embodiments, the optical fiber preform 128 may be processed to a purity encompassing from about 0.2 ppb to about 0.9 ppb, from about 0.3 ppb to about 0.8 ppb, from about 0.4 ppb to about 0.7 ppb, or from about 0.5 ppb to about 0.6 ppb by weight of impurities. In that regard, the muffle 108 may be formed from fused silica due to its unreactive nature and relative inertness, particularly at elevated temperatures. However, fused silica may be unsuitable for use in high-pressure processes due to the tendency of fused silica to fracture easily under stress. Therefore, as described herein, the pressure of the first interior volume 118 should be controlled to be similar to or even equal to the pressure of the second interior volume 126 to reduce or mitigate fracture of the fused silica muffle. In embodiments, the muffle 108 may be formed from a relatively unreactive ceramic material, such as silicon carbide (SiC) or silicon nitride ($Si_3N_4$).

Reduction of the pressure differential across the sidewall 152 of the muffle 108 may be accomplished by regulating the flow of gases inside the muffle 108 as well as the flow of gases outside the muffle 108, such as the gases in the first interior volume 118. Specifically, in the embodiments described herein, a second inlet 110 may be sealingly coupled to the muffle 108 and to a process gas source 162 for supplying a process gas to the second interior volume 126 of the muffle 108, as shown in FIG. 1A. In embodiments, the second inlet 110 may extend through the furnace body 102. Referring again to FIGS. 2A and 2B by way of example, in embodiments, the second inlet 110 may extend through the lid 122 of the furnace body 102. In embodiments (not depicted), the second inlet 110 may extend through the pressure vessel 120 of the furnace body 102. In embodiments, the second inlet 110 may extend through the lid 122 of the furnace body 102 and the muffle flange 154 of the muffle 108, as depicted in FIG. 2A.

In embodiments, the process gas may be supplied to the second interior volume 126 from the process gas source 162 such that the pressure of the second interior volume is from about 100 kPa to about 5000 kPa, from about 500 kPa to about 5000 kPa, from about 1000 kPa to about 5000 kPa, from about 1500 kPa to about 4000 kPa, from about 2000 kPa to about 4000 kPa, from about 2500 kPa to about 4000 kPa, from about 3000 kPa to about 4000 kPa, from about 3500 kPa to about 4000 kPa, from about 100 kPa to about 3500 kPa, from about 100 kPa to about 3000 kPa, from about 100 kPa to about 2500 kPa, from about 100 kPa to about 2000 kPa, from about 100 kPa to about 1500 kPa, from about 100 kPa to about 1000 kPa, or from about 100 kPa to about 500 kPa.

As described herein, in embodiments, the processing of optical fiber preform 128 may comprise flowing a process gas through the second interior volume 126 of the muffle 108. A continuous flow of process gas may facilitate reducing or mitigating contamination of the processing environment immediately adjacent to the optical fiber preform 128. In particular, a continuous flow of process gas may prevent contaminants from being circulated through the second interior volume 126 of the muffle 108. Specifically, in embodiments the process gas may be supplied to the second interior volume 126 at one end of the muffle 108 and exhausted from the second interior volume 126 at an opposite end of the muffle 108. This flow of process gas may flush any contaminants from the processing environment as well as prevent additional contaminants from entering the processing environment.

Figure 2C:
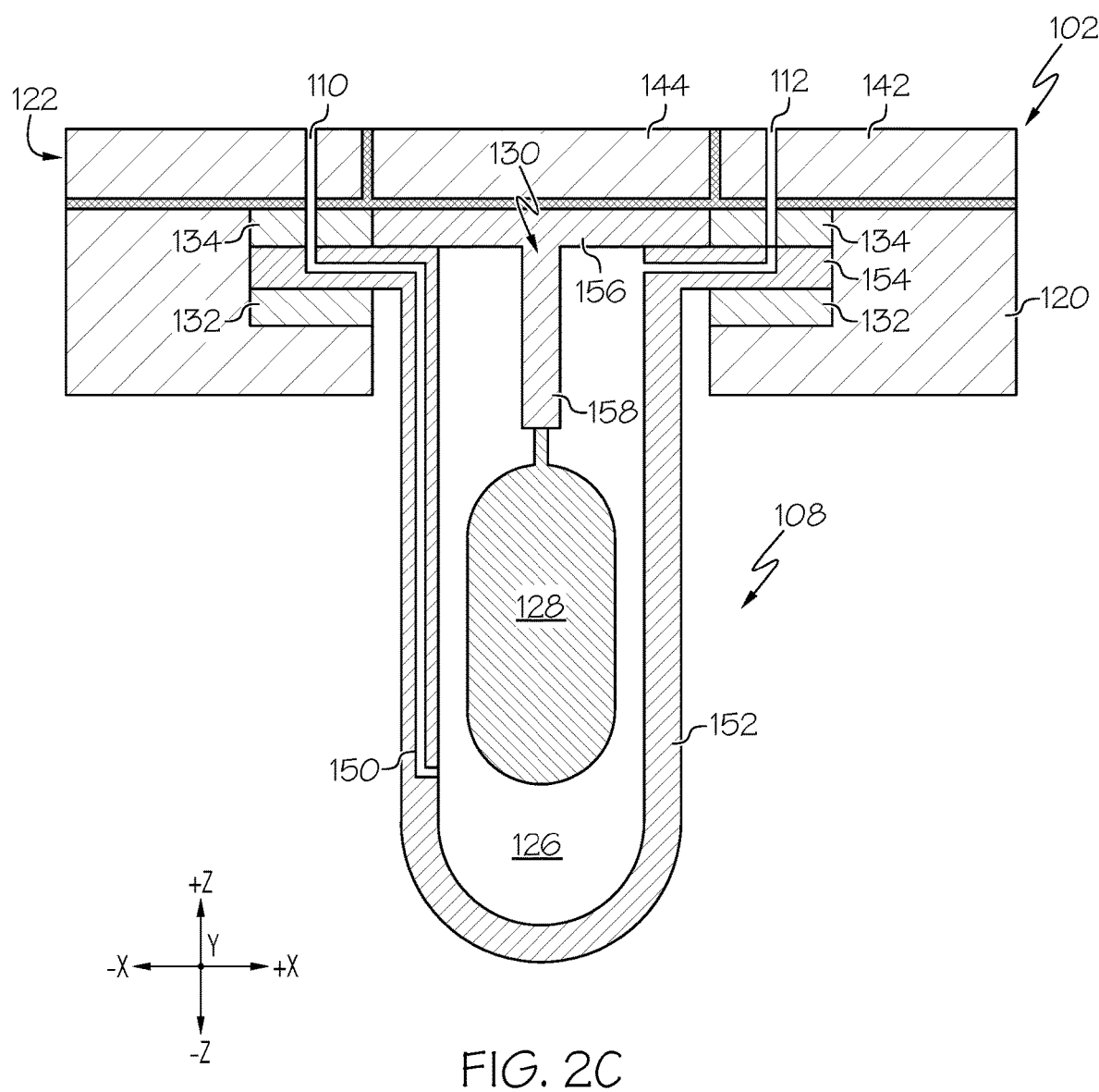
FIG. 2C schematically depicts a close-up view of a portion of the apparatuses for processing an optical fiber preform depicted in FIGS. 1A-1E, according to one or more embodiments shown and described herein.
Figure 2D:
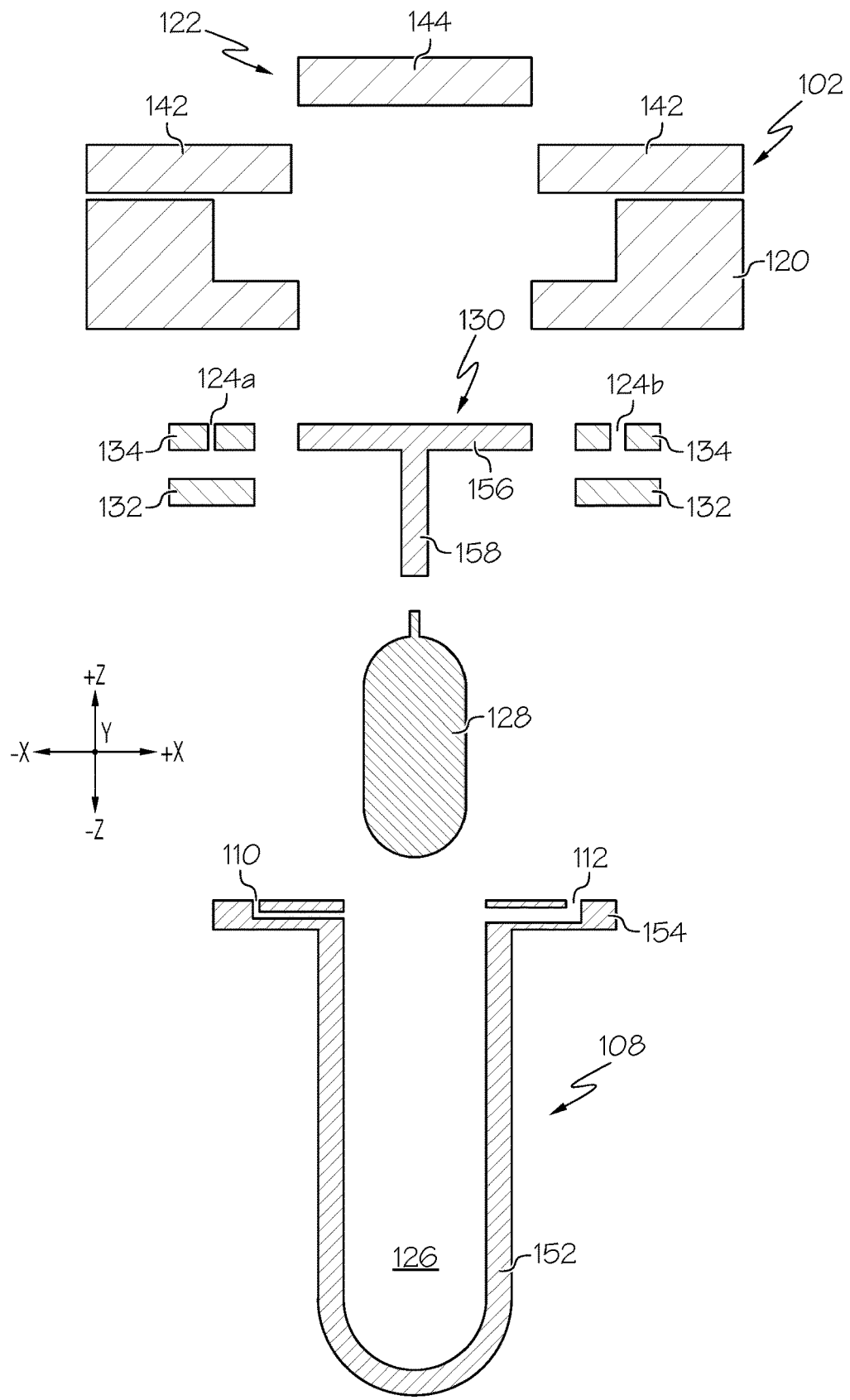
FIG. 2D schematically depicts an exploded view of the portion of the apparatuses depicted in FIGS. 2A-2C, according to one or more embodiments shown and described herein.

Referring again to FIGS. 2A-2C, in embodiments the second inlet 110 may comprise a fused silica tube 150 which extends from the top of the second interior volume 126 (i.e., in the +Z direction of the coordinate axis depicted in the figures) to the interior or bottom of the second interior volume 126 (i.e., in the −Z direction of the coordinate axis depicted in the figures). Referring to FIG. 2A, in embodiments the fused silica tube 150 may extend through the muffle flange 154 and down through the second interior volume 126 along the inner surface of the sidewall 152. Referring to FIG. 2B, in embodiments the fused silica tube 150 may extend through the muffle flange 154 and down along the outer surface of the sidewall 152 before extending through the sidewall 152 and into the second interior volume 126. Referring to FIG. 2C, in embodiments the fused silica tube 150 may extend through the muffle flange 154 and down through the sidewall 152 within the thickness of the sidewall 152, before exiting the sidewall 152 and opening into the second interior volume 126. In embodiments (not depicted), the second inlet 110 may be sealingly coupled to the muffle 108 at the bottom or sealed end of the muffle 108.

In the embodiments described herein, a second outlet 112 may be sealingly coupled to the muffle 108 for exhausting the process gas from the second interior volume 126 of the muffle 108. Referring again to FIGS. 2A-2D, in embodiments the second outlet 112 may extend through the lid 122 of the furnace body 102. In embodiments (not depicted), the second outlet 112 may extend through the pressure vessel 120 of the furnace body 102. In embodiments, the second outlet 112 may extend through the lid 122 of the furnace body 102 and the muffle flange 154 of the muffle 108, as depicted in FIGS. 2A-2C. As described hereinabove, a continuous flow of process gas through the second interior volume 126 of the muffle 108 may be facilitated by the supply of process gas to the second interior volume 126 at one end of the muffle 108 and the exhaust of the process gas from the second interior volume 126 at an opposite end of the muffle 108. As such, in embodiments where the second inlet 110 comprises a fused silica tube 150 which introduces the process gas into the second interior volume 126 distal from the muffle flange 154 as depicted in FIG. 2A, the second outlet 112 may extend through the muffle flange 154 of the muffle 108 such that the second inlet 110 and the second outlet 112 are spaced apart from one another in a vertical direction (i.e., the +/−Z direction of the coordinate axes depicted in the figures).

Still referring to FIGS. 2A and 2B, in the embodiments described herein the apparatus 100 may further comprise a handle assembly 130 for supporting the optical fiber preform 128 in the muffle 108. The handle assembly 130 may generally comprise a handle flange 156 and a support shaft 158. In embodiments, the support shaft 158 extends downward from the handle flange 156 (i.e., the support shaft 158 extends away from the handle flange 156 in the −Z direction of the coordinate axis depicted in the figures). In embodiments, the optical fiber preform 128 may be removably coupled to the end of the support shaft 158 distal from the handle flange 156 (i.e., the end of the end of the support shaft 158 in the −Z direction of the coordinate axis depicted in the figures). For example, in embodiments, the support shaft 158 may comprise a slot comprising and at least one channel. In embodiments, the support shaft 158 may comprise a t-slot, a dovetail slot, or a fir tree-slot, for example and without limitation.

As noted herein, the handle assembly 130 may support the optical fiber preform 128. As such, the optical fiber preform 128 may comprise a connector corresponding to the geometry of the slot of the support shaft 158. For example, in embodiments where the support shaft 158 comprises a t-slot the optical fiber preform 128 may comprise a t-connector. In embodiments where the support shaft 158 comprises a fir tree-slot the optical fiber preform 128 may comprise a fir tree-connector, and so forth. As such, the optical fiber preform 128 may be removably coupled to the support shaft 158 of the handle assembly 130.

The handle assembly 130 may be removably coupled to the muffle 108 and extend into the second interior volume 126 of the muffle 108 as depicted in FIG. 2A. In embodiments, the handle flange 156 of the handle assembly 130 may be seated on the muffle flange 154 of the muffle 108. In embodiments, a gasket (not depicted) may be disposed between the handle flange 156 of the handle assembly 130 and the muffle flange 154 of the muffle 108. The gasket may comprise, for example and without limitation, a flexible graphite material. When compressed between the handle flange 156 and the muffle flange 154, the gasket may form an airtight seal between the handle assembly 130 and the muffle 108. That is, the gasket may facilitate the complete sealing of the second interior volume 126 of the muffle 108. As described hereinabove, a processing environment with minimal contaminants may result in a higher quality optical fiber and, as such, it may be advantageous to reduce contaminants within the second interior volume 126 of the muffle 108. In that regard, the creation of an airtight seal between the second interior volume 126 and the outside environment may result in a processing environment with fewer contaminants and a higher quality optical fiber preform.

Referring again to FIG. 1A, in embodiments heating elements 138a-138c are disposed within the first interior volume 118 around the muffle 108. In embodiments, the processing of an optical fiber preform, such as doping and sintering, may include exposing the optical fiber preform to temperatures of from about 1000° C. to about 1500° C. In embodiments, the heating elements 138a-138c may be used to heat the muffle 108, the optical fiber preform 128, or both to temperatures of from about 1050° C. to about 1500° C., from about 1100° C. to about 1500° C., from about 1150° C. to about 1500° C., from about 1200° C. to about 1500° C., from about 1250° C. to about 1500° C., from about 1300° C. to about 1500° C., from about 1350° C. to about 1500° C., from about 1400° C. to about 1500° C., from about 1450° C. to about 1500° C., from about 1000° C. to about 1450° C., from about 1000° C. to about 1400° C., from about 1000° C. to about 1350° C., from about 1000° C. to about 1300° C., from about 1000° C. to about 1250° C., from about 1000° C. to about 1200° C., from about 1000° C. to about 1150° C., from about 1000° C. to about 1100° C., or from about 1000° C. to about 1050° C.

In embodiments, the heating elements 138a-138c may be independently operated to create heating zones along the length of the muffle 108 (i.e., the dimension of the muffle 108 extending in the +/−Z direction of the coordinate axes depicted in the figures). In particular, the heating elements 138a-138c may be independently operated to create a temperature gradient over the length of the muffle or, alternatively, to obtain a uniform temperature distribution over the length of the muffle. For example and without limitation, heating element 138a may heat the upper portion of the muffle 108 to 1000° C., heating elements 138b may heat the middle portion of the muffle 108 to 138b to 1250° C., and heating element 138c may heat the lower portion of the muffle 108 to 1500° C. That is, the heating elements 138a-138c may create multiple temperature zones and/or a temperature gradient along the length of the muffle 108. The sintering process may be governed, at least in part, by the local viscosity of the optical fiber preform, which is in turn governed by the local temperature of the optical fiber preform. As such, in embodiments it may be advantageous to control the local temperature of the optical fiber preform 128 to control the local viscosity and the sintering process.

In embodiments, an insulation layer 140 may disposed within the first interior volume 118 between the heating elements 138a-138c and the pressure vessel 120 of the furnace body 102. As described herein, in embodiments, the processing of an optical fiber preform comprises heating the muffle 108 and the second interior volume 126 to temperatures greater than 1000° C. Such temperatures may exceed the operational limits of the material of the pressure vessel 120. For example, heating the pressure vessel 120 to these temperatures may compromise the integrity of the pressure vessel or result in structural deformities that may negatively affect the performance of the apparatus. As such, in the embodiments described herein, an insulation layer 140 may be disposed between the heating elements 138 and the pressure vessel 120 to prevent the pressure vessel 120 from being heated to the same temperatures as the muffle 108.

Figure 1D:
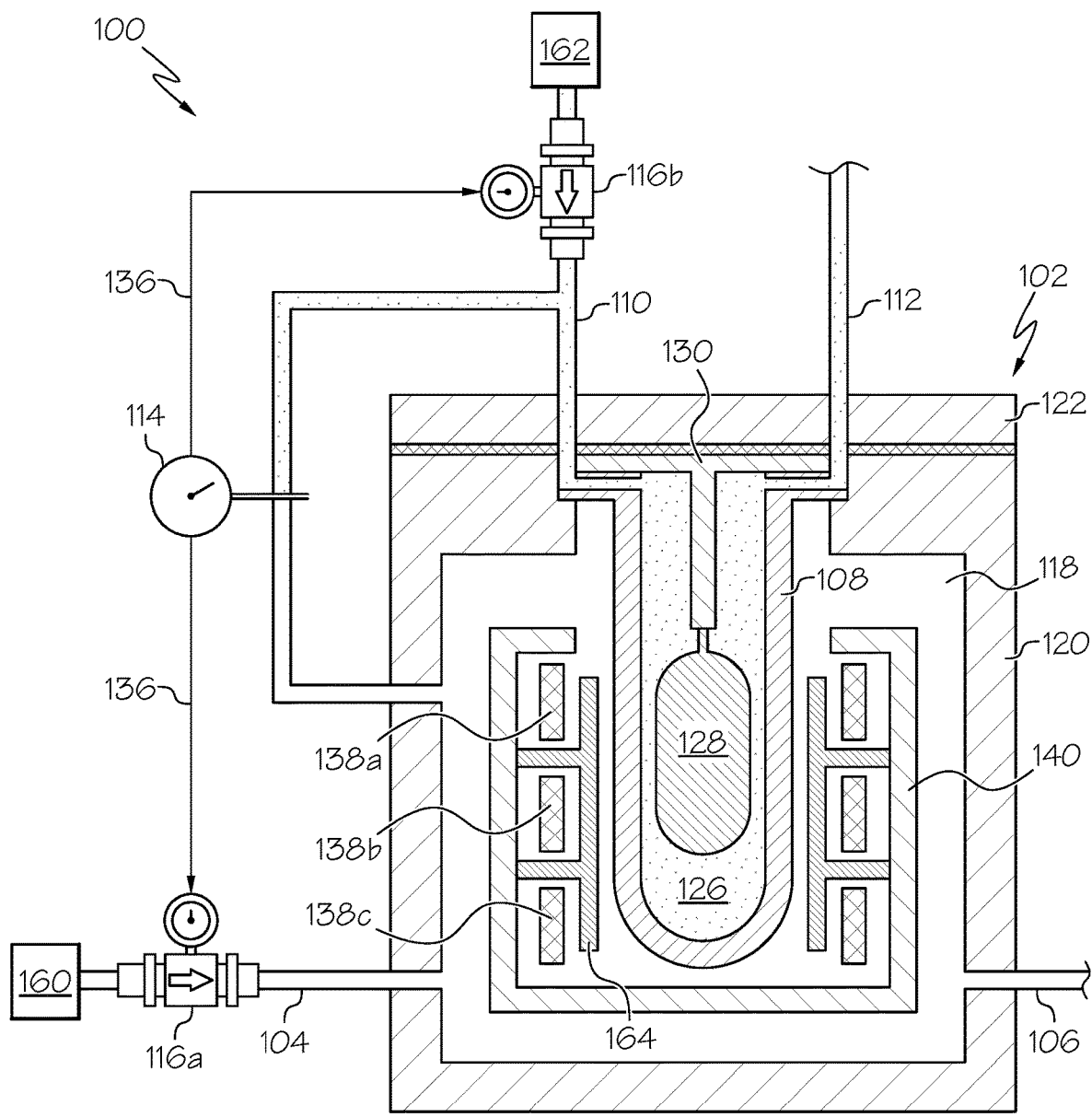
FIG. 1D schematically depicts a cross section of an apparatus for processing an optical fiber preform, according to one or more embodiments shown and described herein.

Referring now to FIG. 1D, in embodiments baffles, such as baffle 164, are disposed within the first interior volume 118 between the heating elements 138a-138c and the muffle 108. As described herein, in embodiments, the processing of an optical fiber preform comprises heating the muffle 108 and the second interior volume 126 to temperatures greater than 1000° C. while also pressurizing the first interior volume 118 to pressures greater than 500 kPa. This combination of high temperatures and high pressures may result in the formation of convection currents that may hinder the processing of some optical fiber preforms. For example, the convection currents may hinder axial sintering of the optical fiber preforms. As such, in the embodiments described herein, one or more baffles, such as baffle 164, may be disposed within the first interior volume 118 between the heating elements 138a-138c and the muffle 108 to reduce or prevent the formation of convection currents within the first interior volume 118. The baffles should comprise a material suitable for use at temperatures greater than 1000° C. and pressures greater than 500 kPa. For example, in embodiments the baffles may comprise silicon carbide. However, if the thermal conductivity of the material of the baffles is too great, the temperature gradient formed by the independent operation of the heating elements 138a-138c may become smeared. That is, if the thermal conductivity of the material of the baffles is too great, the temperature of the baffle 108 and the second interior volume 126 may become relatively uniform and hinder the processing of some optical fiber preforms, such as axial sintering.

Figure 1E:
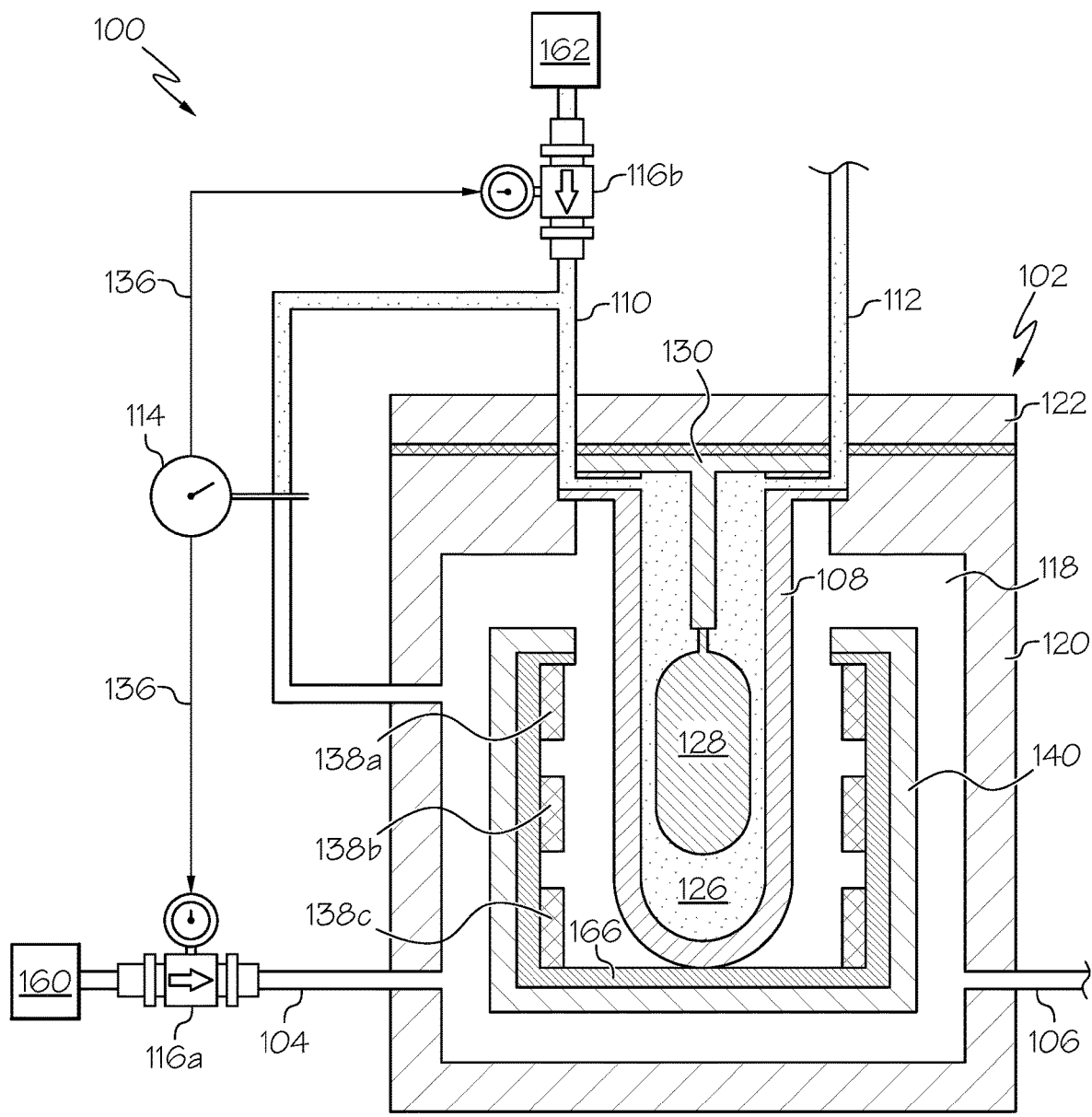
FIG. 1E schematically depicts a cross section of an apparatus for processing an optical fiber preform, according to one or more embodiments shown and described herein.

Referring now to FIG. 1E, in embodiments a reflective layer 166 may be disposed within the first interior volume 118 between the insulation layer 140 and the heating elements 138a-138c. As described herein, in embodiments, the processing of an optical fiber preform comprises heating the muffle 108 and the second interior volume 126 to temperatures greater than 1000° C. Such temperatures may exceed the operational limits of the material of the pressure vessel 120. For example, heating the pressure vessel 120 to these temperatures may compromise the integrity of the pressure vessel or result in structural deformities that may negatively affect the performance of the apparatus. Moreover, significant amounts of power may be required for the heating elements 138a-138c to achieve these temperatures, particularly when the heat dissipates through the pressure vessel 120. As such, in the embodiments described herein, a reflective layer 166 may be disposed between the heating elements 138a-138c and the pressure vessel 120, such as between the insulation layer 140 and the heating elements 138a-138c, to reduce or prevent heat loss and/or prevent the pressure vessel 120 from being heated to the same temperatures as the muffle 108. The reflective layer 166 may comprise a material that is operable to reflect at least a portion of the heat generated by the heating elements 138a-138c away from the pressure vessel 120 and is suitable for use at temperatures greater than 1000° C. For example, in embodiments the baffles may comprise platinum, molybdenum disilicide ($MoSi_2$), or both.

In the embodiments described herein, the differential pressure gauge 114 is fluidly coupled to the first interior volume 118 and the second interior volume 126. In embodiments, the differential pressure gauge 114 may be directly coupled to the first interior volume 118, coupled to the first inlet 104 that is in turn coupled to the first interior volume 118, or coupled to the first outlet 106 that is in turn coupled to the first interior volume 118. In embodiments, the differential pressure gauge 114 may be directly coupled to the second interior volume 126, coupled to the second inlet 110 that is in turn coupled to the second interior volume 126, or coupled to the second outlet 112 that is in turn coupled to the second interior volume 126. For example, in embodiments the differential pressure gauge 114 may be directly coupled to the first interior volume 118 and coupled to the second inlet 110 that is in turn coupled to the second interior volume 126, as depicted in FIG. 1A. The differential pressure gauge 114 may measure the difference between the pressure of the first interior volume 118 and the second interior volume 126 during the processing of an optical fiber preform 128. This may allow for the monitoring and adjusting the difference in pressure between the first interior volume 118 and the second interior volume 126 to prevent the mechanical failure of the muffle 108.

In the embodiments described herein, the flow controller, such as flow controllers 116a and 116b depicted in FIG. 1A, may generally comprise a processor and a non-transitory memory storing computer readable and executable instructions which, when executed by the processor, adjust the flow of the annulus gas, the process gas, or both to control the pressure differential between the first interior volume 118 and the second interior volume 126. In embodiments, where the apparatus comprises a single flow controller, the flow controller 116a may be fluidly coupled to the annulus gas source 160 and the first inlet 104, as depicted in FIG. 1A. Alternatively, in embodiments where the apparatus comprises a single flow controller, the flow controller 116b may be fluidly coupled to the process gas source 162 and the second inlet 110, also depicted in FIG. 1A. In embodiments, the apparatus 100 may comprise a plurality of flow controllers. For example, in embodiments, a flow controller 116a may be fluidly coupled to the annulus gas source and the first inlet 104 and a flow controller 116b may be fluidly coupled to the process gas source and the second inlet 110. The flow controllers 116a and 116b may increase or decrease the flow rate of gas from a gas source to the apparatus. For example, if a higher pressure is desired within the second interior volume 126, the flow controller 116b increases the flow rate of process gas from the process gas source 162 through the second inlet 110 into the second interior volume 126.

In the embodiments described herein, the differential pressure gauge 114 may be communicatively coupled to flow controller 116a and/or flow controller 116b. As described hereinabove, the differential pressure gauge 114 may measure the difference in pressure between the first interior volume 118 and the second interior volume 126. The differential pressure gauge 114 may then produce and transmit a differential pressure signal 136 to at least one flow controller, such as flow controllers 116a and 116b depicted in FIG. 1A. The flow controllers 116a and 116b may receive a differential pressure signal 136 from the differential pressure gauge 114 and, in response, adjust the flow of gas from at least one of the annulus gas source 160 or the process gas source 162 such that the pressure differential between the first interior volume 118 and the second interior volume 126 is from −7.0 kPa to 7.0 kPa, from −7.0 kPa to 6.0 kPa, from −7.0 kPa to 5.0 kPa, from −7.0 kPa to 4.0 kPa, from −7.0 kPa to 3.0 kPa, from −7.0 kPa to 2.0 kPa, from −7.0 kPa to 1.0 kPa, from −7.0 kPa to 0.0 kPa, from −6.0 kPa to 7.0 kPa, from −5.0 kPa to 7.0 kPa, from −4.0 kPa to 7.0 kPa, from −3.0 kPa to 7.0 kPa, from −2.0 kPa to 7.0 kPa, from −1.0 kPa to 7.0 kPa, or from 0.0 kPa to 7.0 kPa. As described hereinabove, the muffle 108 may be formed from fused silica to facilitate a high purity environment that aids in the production of a high purity optical fiber preform. However, fused silica may deform or fail under minimal stress. When the pressure differential is less than −7.0 kPa (i.e., the pressure within the first interior volume 118 is greater than the pressure within the second interior volume 126) the muffle 108 may collapse. When the pressure differential is greater than 7.0 kPa (i.e., the pressure within the second interior volume 126 is greater than the pressure within the first interior volume 118) the muffle 108 may expand until it cracks or deforms against other elements within the first interior volume 118.

The flow controllers 116a and 116b, in conjunction with the differential pressure gauge 114, may be able to minimize such expansion or contraction by adjusting the pressure within the first interior volume 118, the second interior volume 126, or both to minimize or eliminate the pressure differential.

Based on the foregoing, a method for processing an optical fiber preform with improved efficiency can be achieved utilizing the disclosed embodiments as described in further detail herein.

Figure 4:
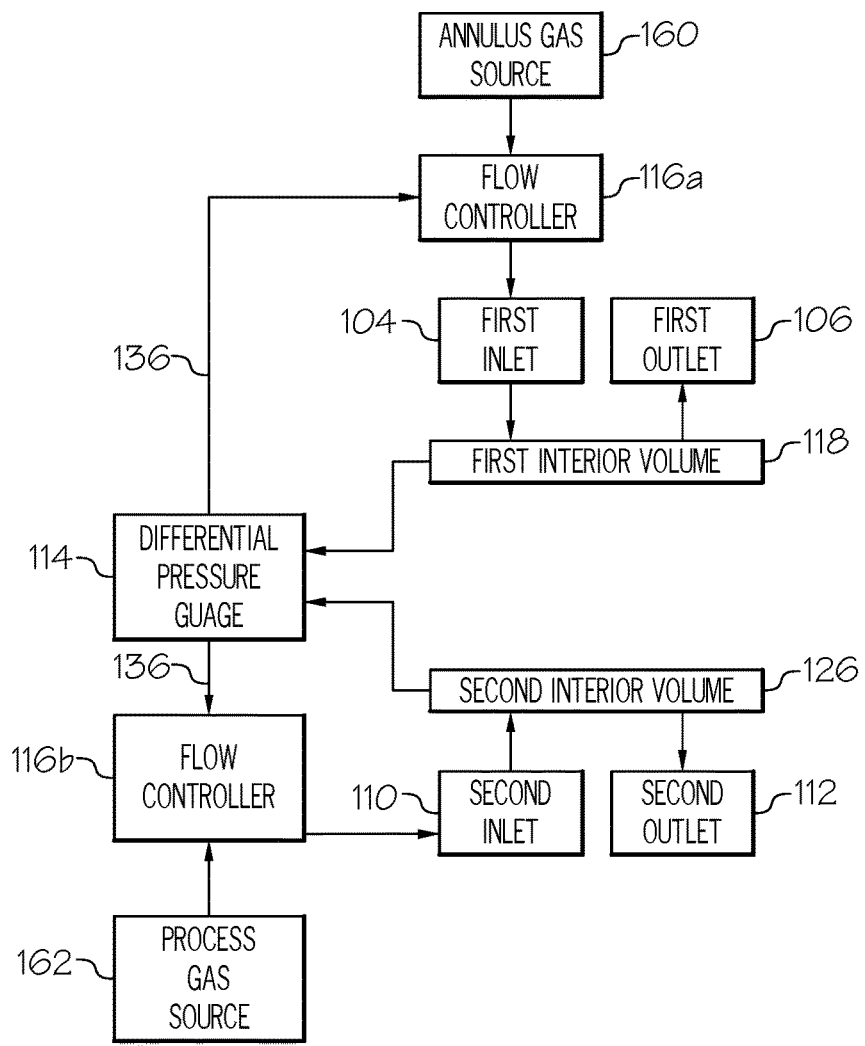
FIG. 4 schematically depicts a block diagram of the apparatuses for processing an optical fiber preform depicted in FIGS. 1A-1E, according to one or more embodiments shown and described herein.

Referring now to FIG. 4, the method for processing an optical fiber preform may generally comprise suspending the optical fiber preform within the second interior volume 126 and supplying a process gas from a process gas source 162 to the second interior volume 126. In embodiments, the process gas may be supplied from the process gas source 162 to the second interior volume 126 through the second inlet 110 and exhausted from the second interior volume 126 through the second outlet 112. In embodiments, the process gas comprises chlorine gas ($Cl_2$). Chlorine gas may be suitable to dry the second interior volume 126 and/or to dry or dope the optical fiber preform 128. That is, $Cl_2$ may be suitable to facilitate the removal of moisture, such as water ($H_2O$), from the second interior volume 126 or the optical fiber preform 128. In embodiments, $Cl_2$ may be supplied to the second interior volume 126 such that the pressure of $Cl_2$ in the second interior volume 126 is about 200 kPa. In embodiments, the process gas comprises a doping gas. In embodiments, the doping gas comprises a silicon gas ($SiX_4$), wherein X comprises a halogen. For example, in embodiments the doping gas is $SiCl_4$, $SiBr_4$, of $SiF_4$. The doping gas may be suitable to facilitate the introduction of dopants (e.g., halogens) into the optical fiber preform 128. In embodiments, the process gas comprises a doping gas and a diluent gas. Diluent gases include noble gases and inert gases, such as Ar, $N_2$, He, and Kr, for example and without limitation.

In embodiments, the process gas may be supplied to the second interior volume 126 such that the pressure or partial pressure of the process gas in the second interior volume 126 is from about 200 kPa to about 5000 kPa. In embodiments, the doping gas may be supplied to the second interior volume 126 such that the pressure in the second interior volume 126 is from about 500 kPa to about 5000 kPa, from about 1000 kPa to about 4500 kPa, from about 1500 kPa to about 4000 kPa, from about 2000 kPa to about 3000 kPa, from about 200 kPa to about 2000 kPa, from about 200 kPa to about 1500 kPa, from about 200 kPa to about 1000 kPa, or from about 200 kPa to about 500 kPa. The desired pressure within the second interior volume 126 may be dependent on the composition of the doping gas as well as the desired level of dopants within the optical fiber preform 128.

In embodiments, the doping gas may be supplied to the second interior volume 126 such that the pressure or partial pressure of the doping gas in the second interior volume 126 is from about 200 kPa to about 5000 kPa. In embodiments, the doping gas may be supplied to the second interior volume 126 such that the pressure or partial pressure of the doping gas in the second interior volume 126 is from about 500 kPa to about 5000 kPa, from about 1000 kPa to about 4500 kPa, from about 1500 kPa to about 4000 kPa, from about 2000 kPa to about 3000 kPa, from about 200 kPa to about 2000 kPa, from about 200 kPa to about 1500 kPa, from about 200 kPa to about 1000 kPa, or from about 200 kPa to about 500 kPa. The desired pressure within the second interior volume 126 may be dependent on the composition of the doping gas as well as the desired level of dopants within the optical fiber preform 128.

The method for processing an optical fiber preform may also include supplying an annulus gas from an annulus gas source 160 to the first interior volume 118. In embodiments, the annulus gas may be supplied from the annulus gas source 160 to the first interior volume 118 through the first inlet 104 and exhausted from the first interior volume 118 through the first outlet 106. In embodiments, the annulus gas comprises an inert gas such as argon, for example and without limitation. Argon gas may be suitable to pressurize the first interior volume 118 without exposing elements of the apparatus, such as the heating elements 138a-138c, to a reactive environment that may degrade the elements. In embodiments, the annulus gas may be supplied to the first interior volume 118 such that the pressure in the first interior volume 118 is from about 200 kPa to about 5000 kPa. In embodiments, the annulus gas may be supplied to the first interior volume 118 such that the pressure in the first interior volume 118 is from about 500 kPa to about 5000 kPa, from about 1000 kPa to about 4500 kPa, from about 1500 kPa to about 4000 kPa, from about 2000 kPa to about 3000 kPa, from about 200 kPa to about 2000 kPa, from about 200 kPa to about 1500 kPa, from about 200 kPa to about 1000 kPa, or from about 200 kPa to about 500 kPa. The desired pressure within the first interior volume 118 may be dependent on the pressure of the second interior volume as described hereinabove.

The method for processing an optical fiber preform may also include the differential pressure gauge 114, fluidly coupled to both the first interior volume 118 and the second interior volume 126, measuring the difference between the pressure of the first interior volume 118 and the second interior volume 126. The differential pressure gauge may then generate a differential pressure signal 136 that transmits the measurement to a flow controller, such as flow controllers 116a and 116b depicted in FIG. 4. As described hereinabove, the flow controller 116b may then adjust the flow of the process gas from the process gas source 162 to increase or decrease the pressure of the second interior volume 126 to minimize the differential pressure. In embodiments, the flow controller 116a may adjust the flow of the annulus gas from the annulus gas source 160 to increase or decrease the pressure of the first interior volume 118 to minimize the pressure differential. In embodiments described herein, the pressure differential between the first interior volume 118 and the second interior volume 126 may from −7.0 kPa to 7.0 kPa, from −7.0 kPa to 6.0 kPa, from −7.0 kPa to 5.0 kPa, from −7.0 kPa to 4.0 kPa, from −7.0 kPa to 3.0 kPa, from −7.0 kPa to 2.0 kPa, from −7.0 kPa to 1.0 kPa, from −7.0 kPa to 0.0 kPa, from −6.0 kPa to 7.0 kPa, from −5.0 kPa to 7.0 kPa, from −4.0 kPa to 7.0 kPa, from −3.0 kPa to 7.0 kPa, from −2.0 kPa to 7.0 kPa, from −1.0 kPa to 7.0 kPa, or from 0.0 kPa to 7.0 kPa.

In embodiments, the optical fiber preform may also be exposed to a temperature of from about 1000° C. to about 1500° C. while being exposed to the process gas or doping gas. In embodiments, the optical fiber preform may be exposed to a temperature of from about 1050° C. to about 1500° C., from about 1100° C. to about 1500° C., from about 1150° C. to about 1500° C., from about 1200° C. to about 1500° C., from about 1250° C. to about 1500° C., from about 1300° C. to about 1500° C., from about 1350° C. to about 1500° C., from about 1400° C. to about 1500° C., from about 1450° C. to about 1500° C., from about 1000° C. to about 1450° C., from about 1000° C. to about 1400° C., from about 1000° C. to about 1350° C., from about 1000° C. to about 1300° C., from about 1000° C. to about 1250° C., from about 1000° C. to about 1200° C., from about 1000° C. to about 1150° C., from about 1000° C. to about 1100° C., or from about 1000° C. to about 1050° C. while being exposed to the process gas or doping gas. The temperature may be achieved by the direct heating of the second interior volume 126, the heating of the process gas or doping gas, or both by the heating elements 138a-138c. The temperature may be suitable to facilitate one or more of drying, doping, or sintering of the optical fiber preform 128.

EXAMPLES

The following examples illustrate one or more features of the present disclosure. It should be understood that these examples are not intended to limit the scope of the disclosure or the appended claims.

Example 1

Figure 5:
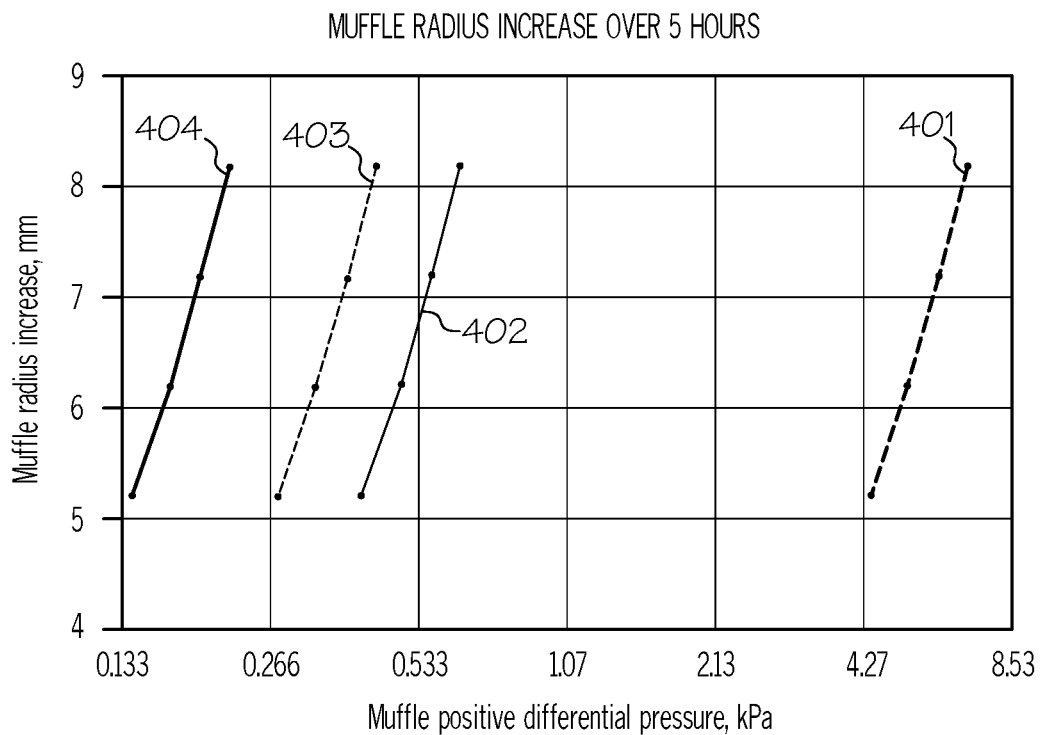
FIG. 5 compares the increase in radius of a muffle (y-axis) with the positive pressure differential within the muffle (x-axis) at various temperatures, according to one or more embodiments shown and described herein.

The change in radius of a fused silica muffle over the course of 5 hours was measured at various temperatures and positive differential pressures. First, the muffle was sealed and heated to the specified temperature. An inert gas was then supplied to the interior volume of the muffle until the desired positive pressure differential (i.e., the difference between the pressure of the interior volume of the muffle and the pressure on the exterior surface of the muffle) was achieved. The positive pressure differential was then maintained for 5 hours. The increase in the outer radius of the muffle from an initial radius to a final radius was then measured and recorded. The results are depicted in FIG. 5. Line 401 represents muffles heated to 1350° C. and subjected to four different positive differential pressures. Line 402 represents muffles heated to 1410° C. and subjected to four different positive differential pressures. Line 403 represents muffles heated to 1430° C. and subjected to four different positive differential pressures. Line 404 represents muffles heated to 1450° C. and subjected to four different positive differential pressures.

As illustrated by FIG. 5, the change in radius of a fused silica muffle is proportional to the positive differential pressure. For example, at a temperature of 1350° C. a positive differential pressure of approximately 4.30 kPa resulted in an increase of the outer radius of the muffle by approximately 5.2 mm and a positive differential pressure of approximately 5.35 kPa resulted in an increase of the outer radius of the muffle by approximately 6.2 mm. FIG. 5 also illustrates that the change in radius of a fused silica muffle is inversely proportional to the viscosity of the silica, which is a function of the temperature of the muffle. For example, at a temperature of 1430° C. a positive differential pressure of approximately 0.280 kPa resulted in an increase of the outer radius of the muffle by approximately 5.2 mm, but at a temperature of 1450° C. an increase of the outer radius of the muffle by approximately 5.2 mm resulted from a positive differential pressure of only approximately 0.150 kPa. This indicates that at the temperatures required to process an optical fiber preform (e.g., 1500° C.) even a minimal positive pressure differential may result in expansion of a fused silica muffle. Such expansion may result in the muffle interfering with other elements of the apparatus or experiencing mechanical failure, such as cracking.

Example 2

Figure 6:
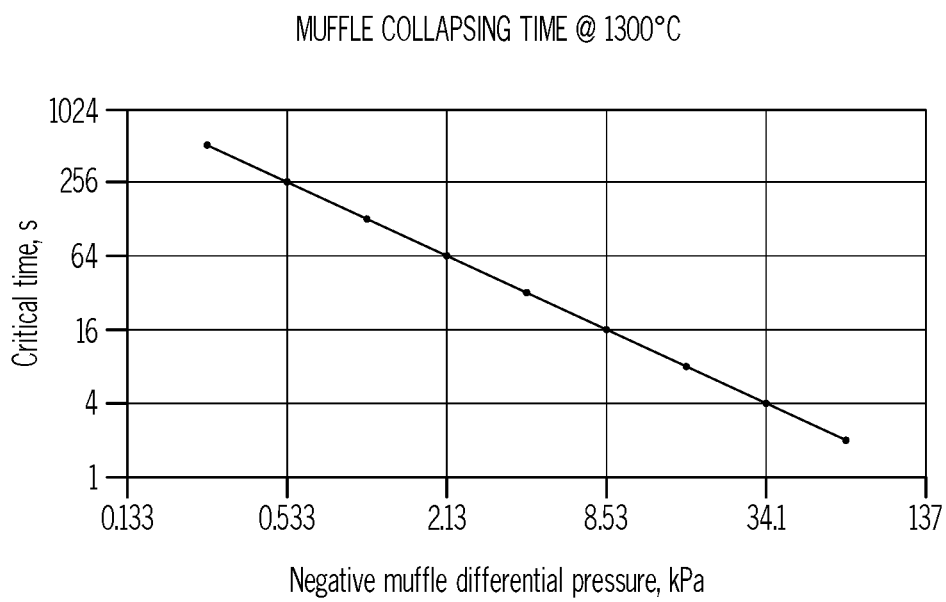
FIG. 6 compares the critical time before the collapse of a muffle (y-axis) with the negative pressure differential within the muffle (x-axis), according to one or more embodiments shown and described herein.

The critical time (i.e., the time required for a fused silica muffle to collapse) at 1300° C. was measured at various negative differential pressures. A muffle with an outer diameter measuring approximately 160 mm and a sidewall thickness measuring approximately 5 mm was sealed and placed within a pressure vessel. The pressure vessel was then heated to 1300° C. The vessel was then pressurized using an inert gas until a specified negative differential pressure (i.e., the difference between the pressure of the interior volume of the muffle and the pressure of the interior volume of the pressure vessel) was achieved. The negative pressure differential was then maintained until the muffle began to collapse (i.e., the sidewall of the muffle began to uncontrollably deform inward). The time lapse between achieving the desired negative differential pressure and the collapse of the muffle was measured and recorded. The results are depicted in FIG. 6 that plots the critical time against the negative differential pressure. As illustrated in FIG. 6, the negative differential pressure is inversely proportional to the time required for a fused silica muffle to collapse. For example, a negative differential pressure of about 0.333 kPa caused the muffle to collapse within approximately 640 seconds while a negative differential pressure of about 85.3 kPa caused the muffle to collapse within only approximately 2 seconds. Similar to Example 1, this indicates that even a minimal negative pressure differential may result in collapse of a fused silica muffle within minutes. Such collapse may result in the complete failure of processing of an optical fiber preform or unacceptable levels of contamination upon the surface of an optical fiber preform.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An apparatus for processing an optical fiber preform, the apparatus comprising:
    a muffle disposed within a furnace body, the muffle configured to receive the optical fiber preform, a space between the muffle and the furnace body defining a first interior volume, a space within the muffle defining a second interior volume sealed from the first interior volume, the second interior volume being sealed from the first interior volume by at least one gasket disposed between and adjacent to the muffle and the furnace body;
    a first inlet coupled to the first interior volume and to an annulus gas source for supplying an annulus gas to the first interior volume and a first outlet coupled to the first interior volume for exhausting the annulus gas from the first interior volume;
    a second inlet coupled to the second interior volume and to a process gas source for supplying a process gas to the second interior volume and a second outlet coupled to the second interior volume for exhausting the process gas from the second interior volume;
    a differential pressure gauge fluidly coupled to the first interior volume and the second interior volume; and
    a flow controller fluidly coupled to at least one of the annulus gas source and the process gas source and communicatively coupled to the differential pressure gauge, the flow controller comprising a processor and a non-transitory memory storing computer readable and executable instructions which, when executed by the processor, cause the flow controller to:
        receive a differential pressure signal from the differential pressure gauge; and
        adjust at least one of a flow of the annulus gas from the annulus gas source and
    a flow of the process gas from the process gas source such that the pressure differential between the first interior volume and the second interior volume is from −7.0 kPa to 7.0 kPa.

2. The apparatus of claim 1, wherein the flow controller is fluidly coupled to the annulus gas source and the process gas source, the flow controller adjusting the flow of the annulus gas from the annulus gas source and the flow of the process gas from the process gas source such that the pressure differential between the first interior volume and the second interior volume is from −7.0 kPa to 7.0 kPa.

3. The apparatus of claim 1, wherein the second inlet comprises a fused silica tube.

4. The apparatus of claim 1, wherein the furnace body comprises a pressure vessel and a lid removably coupled to the pressure vessel, wherein the lid comprises a first lid segment and a second lid segment, the first lid segment having an opening therein, wherein the second lid segment is removably disposed in the first lid segment.

5. The apparatus of claim 1, wherein the second inlet and the second outlet are coupled to the second interior volume at opposite ends of the second interior volume.

6. The apparatus of claim 1, further comprising at least one heating element positioned within the first interior volume and disposed around the muffle.

7. The apparatus of claim 6, wherein the at least one heating element comprises a plurality of heating zones, wherein each heating zone of the plurality of heating zones is independently controlled.

8. A furnace for processing an optical fiber preform, the furnace comprising:
- a muffle disposed within a pressure vessel, the muffle configured to receive the optical fiber preform, a space between the muffle and the pressure vessel defining a first interior volume, a space within the muffle defining a second interior volume sealed from the first interior volume;
- a lid removably coupled to the pressure vessel, wherein the lid comprises a first lid segment and a second lid segment, the first lid segment having an opening therein, wherein the second lid segment is removably disposed in the first lid segment; and
- at least one heating element positioned within the first interior volume and disposed around the muffle.

9. The furnace of claim 8, wherein the second interior volume is sealed from the first interior volume by at least one gasket disposed between the muffle and the pressure vessel.

10. The furnace of claim 8, wherein the second interior volume is sealed from the first interior volume by at least one gasket disposed between the muffle and the pressure vessel and at least one gasket disposed between the muffle and the lid.

11. The furnace of claim 10, wherein the at least one gasket disposed between the muffle and the pressure vessel and the at least one gasket disposed between the muffle and the lid are the same diameter.

12. The furnace of claim 8, further comprising a handle assembly for supporting the optical fiber preform in the muffle, the handle assembly removably coupled to the muffle and extending into the second interior volume.

13. The furnace of claim 12, wherein the handle assembly is removable from the muffle through the opening of the first lid segment.

* * * * *